United States Patent [19]
Cheon

[11] Patent Number: 5,744,937
[45] Date of Patent: Apr. 28, 1998

[54] DUAL BATTERY CHARGING DEVICE FOR CHARGING NICKEL METAL-HYDRIDE AND LITHIUM-ION BATTERIES

[75] Inventor: Kyung-Yong Cheon, Suwon-si, Rep. of Korea

[73] Assignee: SamSung Electronics Co., Ltd., Suwon, Rep. of Korea

[21] Appl. No.: 728,683

[22] Filed: Oct. 10, 1996

[30] Foreign Application Priority Data

Oct. 12, 1995 [KR] Rep. of Korea ............... 35207/1995

[51] Int. Cl.$^6$ ..................................................... H02J 7/00
[52] U.S. Cl. ........................... 320/125; 320/106; 320/150
[58] Field of Search ............................. 320/15, 22, 30, 320/31, 35, 37, 48

[56] References Cited

U.S. PATENT DOCUMENTS

| | | | |
|---|---|---|---|
| 5,164,652 | 11/1992 | Johnson et al. | 320/2 |
| 5,200,686 | 4/1993 | Lee | 320/2 |
| 5,411,816 | 5/1995 | Patino | 429/7 |
| 5,438,248 | 8/1995 | Hyuck | 320/15 |
| 5,479,083 | 12/1995 | Brainard | 320/2 |
| 5,489,836 | 2/1996 | Yuen | 320/32 |
| 5,510,690 | 4/1996 | Tanaka et al. | 320/2 |
| 5,523,668 | 6/1996 | Feldstein | 320/6 |
| 5,541,492 | 7/1996 | Fernandez et al. | 320/22 |
| 5,546,317 | 8/1996 | Andrieu | 364/481 |
| 5,592,069 | 1/1997 | Dias et al. | 320/30 |
| 5,602,455 | 2/1997 | Stephens et al. | 320/2 |
| 5,635,813 | 6/1997 | Shiga et al. | 320/2 |

*Primary Examiner*—Stuart N. Hecker
*Assistant Examiner*—K. Shin
*Attorney, Agent, or Firm*—Robert E. Bushnell, Esq.

[57] ABSTRACT

A dual battery charging device for charging two different types of rechargeable batteries including a battery connector which connects with the battery; a charge circuit which supplies a charge current and a charge voltage to the battery connector to charge a battery; and a sensing controller which senses a temperature and a type of the battery and controls the charge current and the charge voltage output from the charge circuit according to the temperature and the type of the battery. Consequently, the present invention contemplates that either a NiMH battery or a lithium-ion battery can be charged by using a single dual battery charging device.

25 Claims, 5 Drawing Sheets

FIG.3C

DUAL BATTERY CHARGING DEVICE FOR CHARGING NICKEL METAL-HYDRIDE AND LITHIUM-ION BATTERIES

CROSS-REFERENCE TO RELATED APPLICATION

This application makes reference to, incorporates the same herein, and claims all benefits accruing under 35 U.S.C. §119 from an application for *Dual Battery Charge Device And Controlling Method Thereof* earlier filed in the Korean Industrial Property Office on the 12th day of the month of Oct. 1995, and there duly assigned Ser. No. 35207/1995.

BACKGROUND OF THE INVENTION

1. Technical Field

The present invention relates to a dual battery charging device for charging different types of batteries, and more particularly to a dual battery charging device and process for fully charging and recharging a nickel metal-hydride (NiMH) rechargeable battery and a lithium-ion rechargeable battery for use as a power source for portable applications.

2. Background Art

Generally, batteries are used to supply power to portable products such as radios, radiophones, stereo cassette tape players etc. Such batteries are typically available in two different types such as those characterized as rechargeable or non-rechargeable and exhibit different end of life voltage characteristics and effective series resistances. Nonrechargeable battery types are those ordinary alkaline batteries that should not be subjected to recharging attempts. Rechargeable battery types are those nickel-cadmium (Ni—Cd), nickel-hydrogen (Ni—H) and recently developed nickel metal-hydride (Ni—MH) batteries that should be charged at different rates with different conditions. A battery charger which accepts these battery types should adapt the rate of charge and the types of charge controls used in accordance with the battery type.

Traditional battery charger such as those disclosed in U.S. Pat. No. 5,164,652 for *Method And Apparatus For Determining Battery Type And Modifying Operating Characteristics* issued to Johnson et al., U.S. Pat. No. 5,200,686 for *Method And Apparatus For Determining Battery Type* issued to Lee, and U.S. Pat. No. 5,438,248 for *Method And Apparatus For Recognizing Different Types Of Batteries* issued to Hyuck, is designed to automatically recognize the battery type which is to be charged, for example, a Ni—Cd battery or an alkaline battery, and adapt its parameters accordingly. More recent battery chargers such as those disclosed in U.S. Pat. No. 5,489,836 for *Battery Charging Circuit For Charging NiMH And NiCd Batteries* issued to Yuen, and U.S. Pat. No. 5,532,668 for *NiCd/NiMH Battery Charger* issued to Feldstein are designed to recognize and is charge different types of rechargeable batteries such as NiCd and NiMH batteries. Generally, NiCd batteries are preferred in application requiring high discharge rates after prolonged charging at elevated temperature. NiCd batteries have however, been found to be toxic due to their cadmium content. NiMH batteries are often selected where capacity per unit weight or value are critical. NiMH batteries generally have higher energy storage density than the best NiCd designs and do not contain any heavy metal in its composition that can hurt the environment during disposal. However, these conventional rechargeable batteries are still bulky and heavy as a whole.

Recent rechargeable battery technology which seeks to develop a battery using lithium ions that has a large power capacity but a reduction in size and weight, is disclosed in U.S. Pat. No. 5,510,690 for *Battery Pack, Battery Discrimination Control Apparatus And Method Therefor* issued to Tanaka et al. Generally, lithium-ion batteries contain high energy density per volume or per a unit weight, but are selectively used only for specific applications because they are expensive. Currently, there are a number of known battery charging devices that are capable of charging different battery types such as NiCd and NiMH batteries. I have, however, observed that none is available to charge both NiMH and lithium-ion batteries when both NiMH and lithium-ion batteries are used as a power source. Typically, battery chargers which are capable of charging NiMH batteries are not appropriate for charging lithium-ion batteries and vice versa. Consequently, two different charging devices are necessarily required to charge the respective NiMH and lithium-ion batteries.

SUMMARY OF THE INVENTION

Accordingly, it is therefore an object of the present invention to provide an improved battery charger.

It is another object to provide a battery charger that is effective in recharging both NiMH and lithium-ions batteries.

It is also an object to provide a dual battery charging device and a process of determining and charging either a NiMH battery or a lithium-ion battery with a constant-current within a certain capacitance and with a constant-voltage over the capacitance.

These and other objects of the present invention can be achieved by a dual battery charge device including a battery connector having a plurality of terminals disposed thereon, for accommodating an insertion of a rechargeable battery representing one of a nickel metal-hydride battery and a lithium-ion battery for a battery charging operation; a charging circuit coupled to a power source for supplying a charge current and a charge voltage to the battery connector to charge the rechargeable battery; and a controller operatively connected to the battery connector and the charging circuit, for determining a temperature and a type of the battery and controlling the charge current and the charge voltage output from the charging circuit to the battery connector to charge the rechargeable battery in dependence upon the temperature and the type of the battery determined.

A process of charging a NiMH or a lithium-ion battery by a dual battery charger constructed according to the principles of the present invention serves by determining whether a direct current power supply is normal; determining whether a battery temperature is in the range of approximately 0° C. and 40° C. when a rechargeable battery is mounted on a battery connector; determining whether the rechargeable battery mounted on the battery connector is one of a nickel metal-hydride battery and a lithium-ion battery, when the battery temperature is in the range of approximately 0° C. and 40° C.; determining whether a set timer is closed when the lithium-ion battery is mounted on the battery connector; recognizing that the lithium-ion battery is defective when the set timer is closed; charging the lithium-ion battery when operating conditions of the lithium-ion battery are suitable for a standard charging operation and when said set timer is in operation; quickly charging the lithium-ion battery when operating conditions of the lithium-ion battery are suitable for a quick charging operation; recognizing that the lithium-ion battery is defective when the set timer is closed; determining whether a battery cell voltage of the lithium-ion battery is about 4.2

Volts when the set timer is in operation; determining whether the battery cell voltage is suitable to specification of the lithium-ion battery, and recognizing that the lithium-ion battery is defective when the battery cell voltage is not suitable to the specification; determining whether a charge current is below a set value, when the battery cell voltage is suitable to the specification, and completing the charging of the lithium-ion battery.

Alternatively, the process contemplates charging a nickel metal-hydride battery when the rechargeable battery mounted on the battery connector is the nickel metal-hydride battery; determining whether the set timer is closed, and recognizing that the nickel metal-hydride battery is defective when the set timer is closed; determining whether a battery cell voltage of the nickel metal-hydride battery is above 1 Volt when the set timer is in operation; determining whether the battery temperature is below 50° C. when the battery cell voltage is above 1 Volt, and quickly charging the nickel metal-hydride battery when the battery temperature is below about 50° C.; determining whether the set timer is closed, and the battery temperature is below about 55° C. when the set timer is in operation; determining whether the battery cell voltage is below about 1.65 Volts when the battery temperature is below about 55° C.; and determining whether the battery temperature variation is below approximately 1° C. per minute when the battery cell voltage is below about 1.65 Volts and completing the charging of the nickel metal-hydride battery when the battery temperature variation is above approximately 1° C. per minute.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
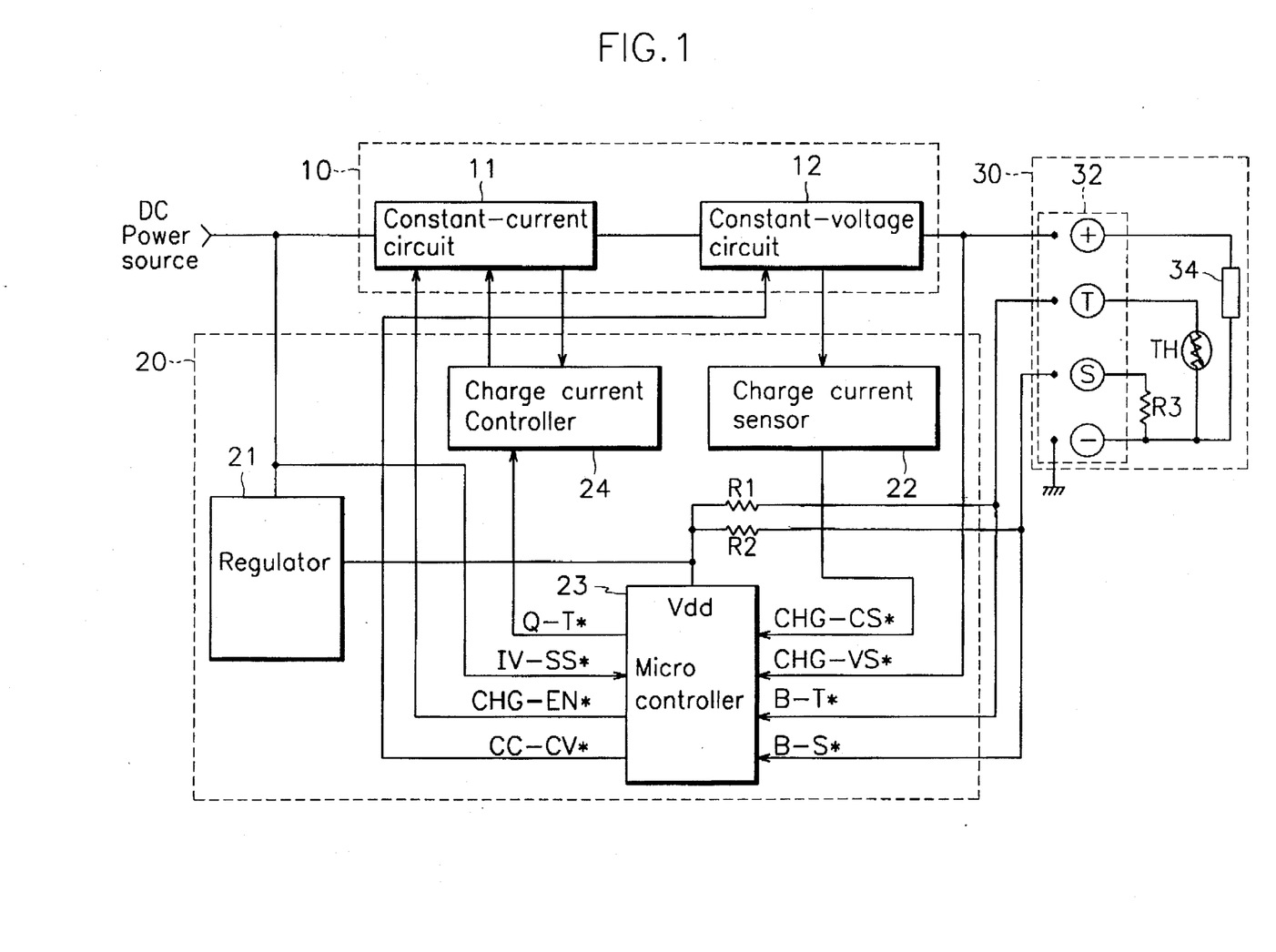
FIG. 1 illustrates a dual battery charge device constructed according to the principles of the present invention.

Referring now to the drawings and particularly to FIG. 1, which illustrates a dual battery charging device constructed according to the principles of the present invention. This dual battery charging device includes a battery pack 30 having a battery connector 32 which connects with a battery 34 contained therein for charging; a charge circuit 10 which supplies a charge current and a charge voltage to the battery connector 30 to charge the battery; and a sensing controller 20 which senses a temperature of the battery, determines the type of the battery and controls the charge current and the charge voltage output from the charge circuit according to the temperature and the type of the battery determined.

The charge circuit 10 includes a constant-current circuit 11 and a constant-voltage circuit 12 serially coupled to receive direct current power from a power supply source. The constant-current circuit 11 supplies the constant charge current to the battery, and the constant-voltage circuit 12 receives direct current power from the power supply and supplies the constant charge voltage to the battery.

The sensing controller 20 includes a regulator 21 which receives direct current power from the power supply source and supplies thereto an operation voltage; a charge current sensor 22 which senses the current flowing to through the battery when a lithium-ion battery is charged by a constant-voltage from the constant-voltage circuit 12; a micro controller 23 comprising a micro processor, a random-access-memory (RAM, a read-only-memory (ROM), a timer and an analog-to-digital (A/D) converter which controls the charge circuit 10 in response to charge available conditions of the battery 34 contained in the battery pack 30 via a first and second resistors R1, R2 from the battery pack 30 (i.e., a state of DC power and a battery) through the A/D converter and generates thereto each corresponding control signal; and a charge current controller 24 which controls the constant-current circuit 11 in response to reception of a control signal output from the micro controller 23.

The battery pack 30 includes a battery connector 32 having a positive and a negative terminal which are coupled to battery 34 via positive and negative battery contacts, a temperature T terminal connected to the negative terminal via a thermistor TH which senses the temperature of the battery 34, and a battery type sensing S terminal connected to the negative terminal via a third resistor R3 which senses the type of battery 334 coupled to the battery connector 32.

Figure 2A:
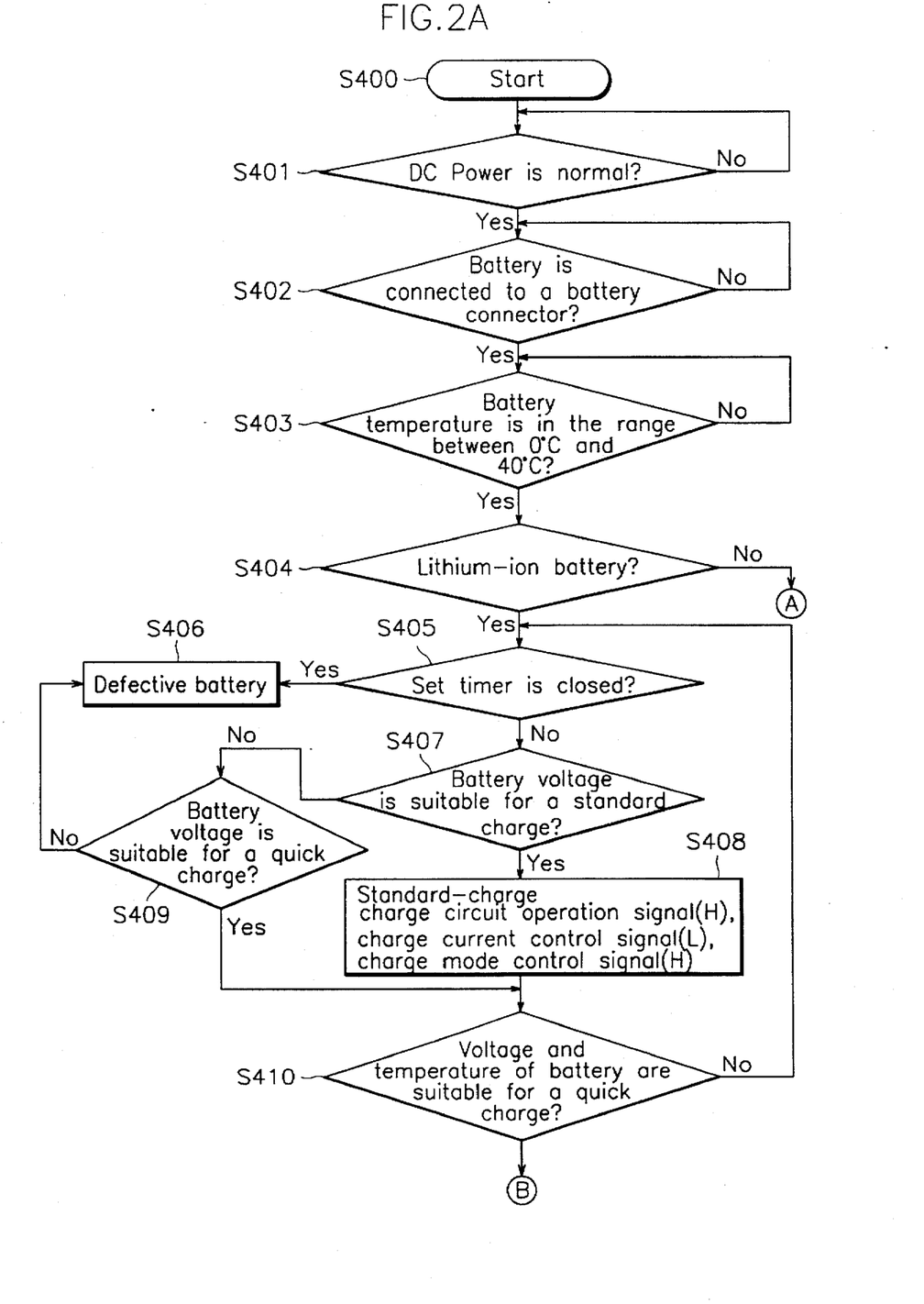
FIGS. 2A–2C are flow charts illustrating a process of controlling the dual battery charging device constructed according to the principles of the present invention.
Figure 2B:
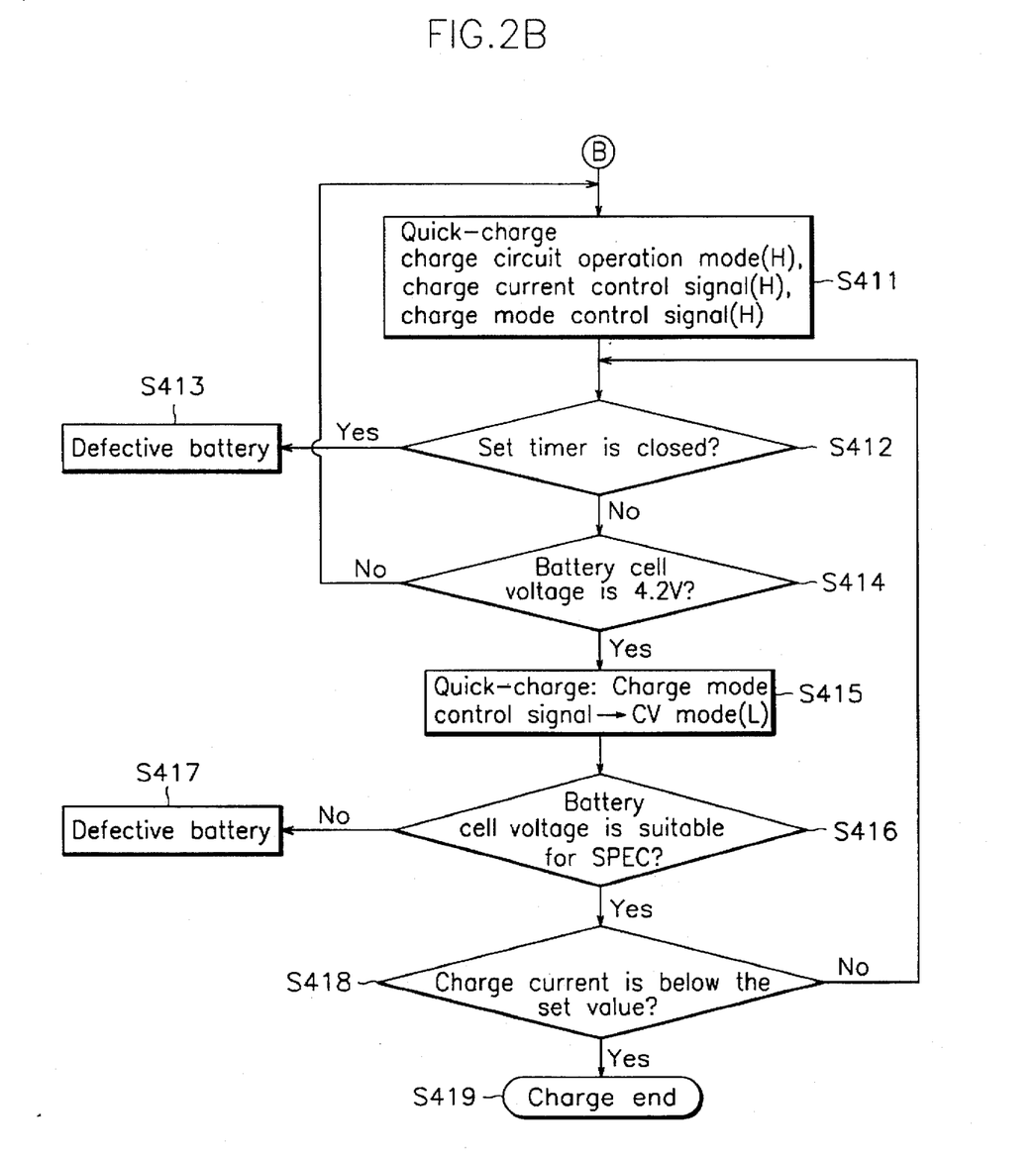
Figure 2C:
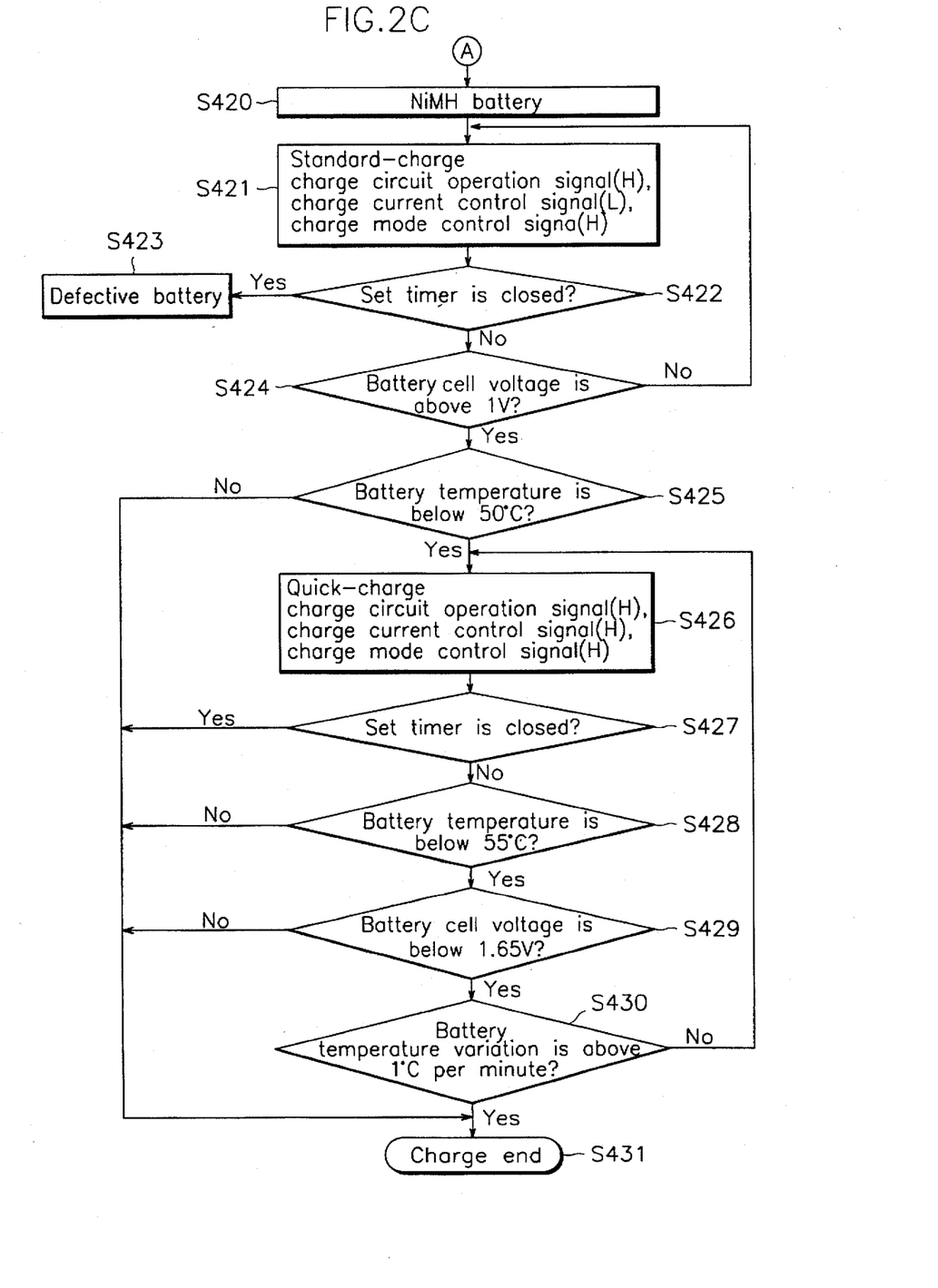

Turning now to FIGS. 2A to 2C which illustrate a process of charging a NiMH battery and a lithium-ion battery using the dual battery charging device constructed according to the principles of the present invention.

First, the micro controller 23 determines whether a direct current power input from an external power supply source is normal in response to reception of an input voltage sensing signal IV-SS* at step 401. If the input voltage sensing signal IV-SS* indicates that the direct current power input from the external power supply source is normal, the micro controller 23 determines whether a battery is mounted on a battery connector at step S402.

When the battery is mounted on the battery connector 30, the micro controller 23 analyzes a battery temperature sensing signal B - T* received from the temperature T terminal of the battery connector 30 and determines whether a temperature of the battery mounted on the battery connector 30 is in the range of approximately 0° C. and 40° C. at step S403.

When the temperature of the battery is in the range between 0° C. and 40° C., the micro controller 23 next analyzes a battery type sensing signal B - S* received from the battery sensing S terminal of the battery connector 30 and determines whether the battery mounted on the battery connector 30 is one of a nickel metal-hydride (NiMH) battery or a lithium-ion battery at step S404. If the battery as mounted on the battery connector 30 is a lithium-ion battery, the micro controller 23 determines whether an internal set timer is closed at step S405. If the set timer is closed at step S405, the micro controller 23 recognizes that the battery is defective at step S406.

If, on the other hand, the set timer of the micro controller 23 is not closed, the micro controller 23 determines whether a battery cell voltage value of the battery is suitable for a standard charge at step S407. When the condition of the battery is suitable for the standard charge at step S407, the micro controller 23 generates a charge circuit operation signal CHG - EN* to initiate operation of the charge circuit 10 at step 408. At the same time, the charge current controller 24 senses a charge current control signal Q - T* exhibiting a low state output from the micro controller 23 and generates a standard charge signal to the constant-current circuit 11. The constant-current charge is selected by the charge mode control signal CC - CV* exhibiting a high state output from the micro controller 23 and the standard charge is started at step S408.

If the battery cell voltage value is not suitable for a standard charge at step S407, the micro controller 23 determines whether the battery may be quick-charged at step S409. When the battery cell voltage value is not suitable for a quick charge, the micro controller 23 determines that the battery is defective at step S406. When the battery cell voltage value is suitable for a quick charge, however, the micro controller 23 determines whether the voltage and the temperature of the battery is suitable for a quick-charge at step S408.

After the battery is determined to be suitable for a quick charge at step S408, the quick-charge of the battery is started at step S411 at shown in FIG. 2B. After the quick charge for the battery is started at step S4 11, the micro controller 23 determines whether a set timer is closed or is not in operation during the charging process at step S412. If the set timer is closed, the micro controller is 23 recognizes the battery as defective at step S413. If the set timer is not closed, however, the micro controller 23 determines whether a battery cell voltage is about 4.2 Volts by analyzing a charge voltage sensing signal CHG - VS* while the battery is being quickly charged at step S414. When the battery cell voltage is above 4.2 Volts at step S414, a charge mode control signal CC - CV* output from the micro controller 23 represents a low state and the battery is quickly charged with a constant-voltage at step S415. When the battery cell voltage is not 4.2 Volts at step S414, however, the micro controller 23 returns to step S411 to continue charging the battery quickly until the battery cell voltage is above 4.2 Volts.

After the battery is quickly charged with a constant voltage at step S415, the micro controller 23 determines whether the battery cell voltage is suitable according to specification at step S416. When the battery cell voltage is not suitable according to specification, the micro controller 23 recognizes that the battery as being defective at step S417. If, on the other hand, the battery cell voltage is suitable according to specification, the micro controller 23 determines whether a charge current is below a set value by analyzing a charge current sensing signal CHG - CS* sensed from the charge current sensor 22 at step S418. When the charge current is above the set critical value, the micro controller 23 returns to step S412 to determine whether the set timer is closed. If the charge current is below the set critical value, however, the charging of the battery terminates at step S419.

Refer back to FIG. 2A, when the micro controller 23 determines that the battery mounted on the battery connector 30 is not a lithium-ion battery at step S404, the micro controller 23 senses a battery sensing terminal of the battery connector 30 and determines whether the battery mounted on the battery connector 30 is a nickel metal-hydride (NiMH) battery at step S420.

When the battery mounted on the battery connector 30 is determined as a nickel metal-hydride (NiMH) battery at step S420, the micro controller 23 generates a charge circuit operation signal CHG - EN* exhibiting a high state to initiate operation of the charge circuit 10 at step 421. At the same time, the charge current controller 24 senses a charge current control signal Q - T* exhibiting a low state output from the micro controller 23 and generates a standard charge signal to the constant-current circuit 11. The constant-current charge is selected by the charge mode control signal CC-CV* exhibiting a high state output from the micro controller 23 and the standard charge of the NiMH battery is started at step S425.

The micro controller 23 then determines whether a set timer is closed or not in operation at step S422. When the set timer is closed at step S422, the micro controller 23 recognizes the battery as defective at step S423. When the set timer is not closed, however, the micro controller 23 determines whether a battery cell voltage is above 1 Volt at step S424. When the battery cell voltage is not above 1 Volt, the micro controller 23 determines whether the set timer is closed at step S422. If the battery cell voltage is above 1 Volt, the micro controller 23 analyzes a battery temperature sensing signal B - T* received from the temperature T terminal of the battery connector 30 and determines whether a temperature of the battery mounted on the battery connector 30 is below 50° C. If the battery temperature is not below 50° C., the charging of the battery is completed. If the battery temperature is below 50° C., however, the micro controller 23 maintains a charge circuit operation signal CHG - EN* and a charge mode control signal CC - CV* in a high state and generates a charge current control signal Q - T* in a low state.

The charge current controller 24 senses the charge current control signal Q - T* exhibiting a high state, outputs a quick charge signal for a quick-charge to the constant-current circuit 11, and the battery is quickly charged at step S426. After the battery is quickly charged at step S426, the micro controller 23 determines whether a set timer is closed at step S427. If the set timer is closed, the charging of the battery is completed at step S431. If the set timer is not closed, however, the micro controller 23 analyzes a battery temperature sensing signal B -T* received from the temperature T terminal of the battery connector 30 and determines whether a temperature of the battery mounted on the battery connector 30 is below 55° C. at step S428. If the battery temperature is not below 55° C., the charging of the battery is completed at step S431. And, if the battery temperature is below 55° C., the micro controller 23 determines whether the battery cell voltage is below 1.65 Volts at step S429. If the battery cell voltage is not below 1.65 Volts, the charging of the battery is completed at step S431. And, if the battery cell voltage is below 1.65 Volts, the micro controller 23 determines whether a battery temperature variation is above 1° C. per minute at step S430. If the battery temperature variation is not above 1° C. per minute, the micro controller 23 returns to step S426 to continue charging the battery quickly until the battery temperature variation is above 1° C. per minute. When the battery temperature variation is above 1° C. per minute, the charging of the battery is completed at step S431.

Figure 3A:
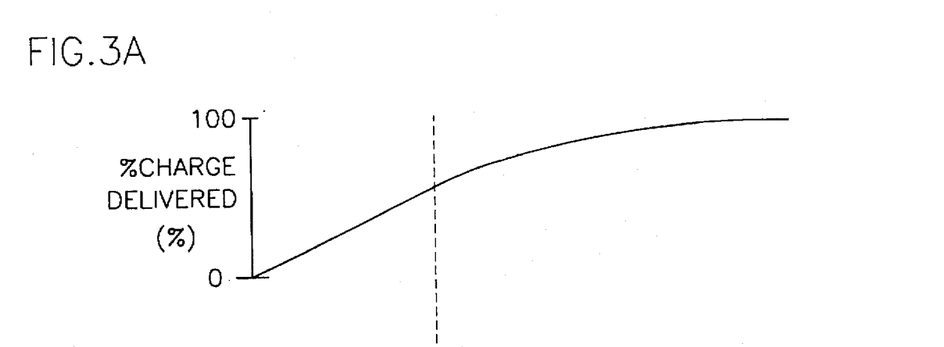
FIGS. 3A to 3C are graphs illustrating a charge rate, cell voltage and charge delivered to the dual battery charging device constructed according to the principles of the present invention.
Figure 3B:
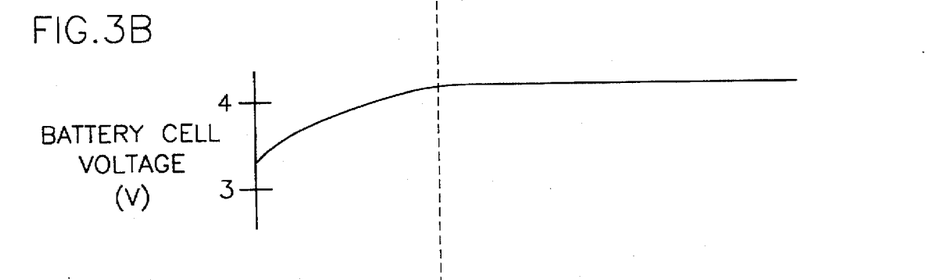
Figure 3C:
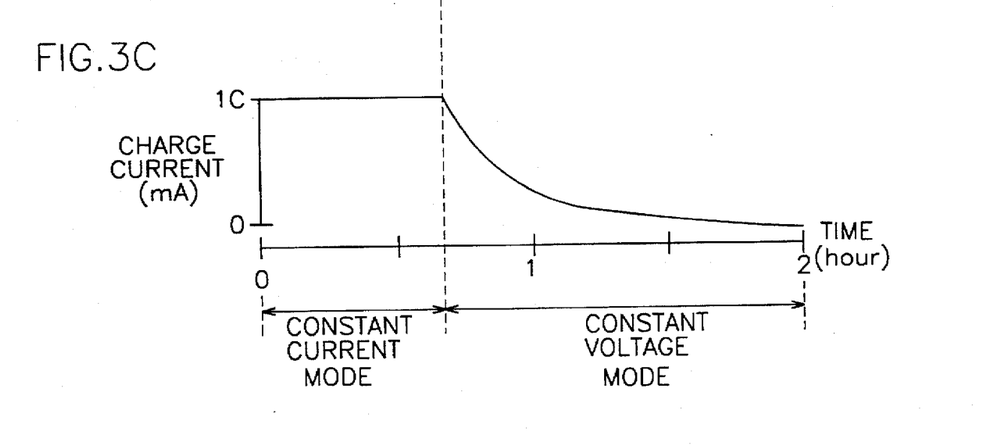

FIGS. 3A to 3C are graphical illustration of the charge rate, cell voltage and charge delivered of the dual battery charging device constructed according to the principles of the present invention. FIG. 3A is a graph illustrating a percentage (%) of charge current delivered to the battery as a function of a charging time (T). Similarly, FIG. 3B is a graph illustrating a voltage level of the battery cell voltage (V) from 3 to 4 Volts as a function of the same charging time (T). FIG. 3C is a graph illustrating a current capacity (C) supplied to the battery as a function of the same charging time (T) when the battery is charged in a constant current mode and a constant voltage mode.

As described above, the dual charging device constructed according to the principles of the present invention can advantageously charge two different types of rechargeable batteries including a NiMH battery or a lithium-ion battery.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A dual battery charging device, comprising:
   battery connector means having a plurality of terminals disposed thereon, for accommodating an insertion of a rechargeable battery selected from the group comprised of nickel metal-hydride batteries and lithium-ion batteries for a battery charging operation;
   charging means comprising constant-current means and constant-voltage means electrically coupled to a power source for respectively supplying a charge current and a charge voltage to said battery connector means, during said battery charging operation to charge said rechargeable battery; and
   controller means operatively connected to said battery connector means and said charging means, for determining a temperature and a type of the rechargeable battery and controlling the charge current and the charge voltage output from said charging means to said battery connector means to charge said rechargeable battery in dependence upon the temperature and the type of the rechargeable battery determined.

2. The dual battery charging device of claim 1, further comprised of said controller means determining the type of the rechargeable battery by measuring a resistance level across positive and negative terminals of the rechargeable battery.

3. A dual battery charging device comprising:
   battery connector means for accommodating an insertion of a rechargeable battery selected from the group comprised of nickel metal-hydride batteries and lithium-ion batteries for a battery charging operation;
   charging means electrically coupled to a power source for supplying a charge current and a charge voltage to said battery connector means, during said battery charging operation, to charge said rechargeable battery; and
   controller means operatively connected to said battery connector means and said charging means, for determining a temperature and a type of the rechargeable battery and controlling the charge current and the charge voltage output from said charging means to said battery connector means to charge said rechargeable battery in dependence upon the temperature and the type of the rechargeable battery determined, said controller means comprising:
   a regulator coupled to receive direct current from said power source, for generating an operation voltage;
   a charge current sensor for sensing the current flowing to the rechargeable battery in response to a first control signal when the rechargeable battery is charged by the charge voltage;
   a charge current controller for controlling the supply of the charge current in response to a second control signal; and
   a micro controller electrically connected to said battery connector means and said charging means, for generating said first control signal and said second control signal to control the charging of the rechargeable battery in dependence upon charge available conditions.

4. The dual battery charging device of claim 1, further comprised of said battery connector means comprising:
   a first terminal for electrically coupled to a positive terminal of the rechargeable battery;
   a second terminal for electrically coupled to a negative terminal of the rechargeable battery;
   a third terminal for sensing the temperature of the rechargeable battery; and
   a fourth terminal for sensing whether the rechargeable battery is one of a nickel metal-hydride battery and a lithium-ion battery.

5. The dual battery charging device of claim 2, further comprised of said battery connector means comprising:
   a first terminal for electrically coupled to a positive terminal of the rechargeable battery;
   a second terminal for electrically coupled to a negative terminal of the rechargeable battery;
   a third terminal for sensing the temperature of the rechargeable battery; and
   a fourth terminal for sensing whether the rechargeable battery is one of a nickel metal-hydride battery and a lithium-ion battery.

6. The dual battery charging device of claim 3, further comprised of said battery connector means comprising:
   a first terminal for electrically coupled to a positive terminal of the rechargeable battery;
   a second terminal for electrically coupled to a negative terminal of the rechargeable battery;
   a third terminal for sensing the temperature of the rechargeable battery; and
   a fourth terminal for sensing whether the rechargeable battery is one of a nickel metal-hydride battery and a lithium-ion battery.

7. A process of charging a rechargeable battery in a portable device, comprising the steps of:
   determining whether a rechargeable battery is mounted in the portable device;
   determining whether a battery temperature is in a normal range when the rechargeable battery is mounted in the portable device;
   determining the type of the rechargeable battery mounted in the portable device, when the battery temperature is in the normal range;
   determining whether a battery cell voltage and a temperature of the rechargeable battery is suitable for one of a first charging mode operation and a second charging mode operation, when the rechargeable battery represents a voltage rechargeable type of batteries:
   charging the rechargeable battery according to the first charging mode operation, when the battery cell voltage and the temperature of the rechargeable battery is suitable for the first charging mode operation; and charging the rechargeable battery according to the second charging mode operation, when the battery cell voltage and the temperature of the rechargeable battery is suitable for the second charging mode operation.

8. The process of claim 7, further comprised of said voltage rechargeable type of batteries corresponding to a lithium-ion battery, and said normal range corresponding to a range of approximately 0° C. to 40° C.

9. The process of claim 8, further comprised of said first charging mode operation corresponding to a standard charging operation and said second charging mode operation corresponding to a quick charging operation.

10. The process of claim 9, further comprised of determining whether a set timer is in operation when the rechargeable battery represents said lithium-ion battery prior to determining whether the rechargeable battery is suitable for one of said first charging mode operation and said second charging mode operation, and then charging the rechargeable battery when said set timer is in operation.

11. The process of claim 10, further comprised of said rechargeable battery being charged until the battery cell voltage reaches a predetermined value.

12. The process of claim 7, further comprising:

determining whether a battery cell voltage and a temperature of the rechargeable battery is suitable for one of said first charging mode operation and said second charging mode operation, when the rechargeable battery represents a current rechargeable type of batteries;

charging the rechargeable battery according to the first charging mode operation, when the battery cell voltage and the temperature of the rechargeable battery is suitable for the first charging mode operation; and charging the rechargeable battery according to the second charging mode operation, when the battery cell voltage and the temperature of the rechargeable battery is suitable for the second charging mode operation.

13. The process of claim 12, further comprised of said current rechargeable type of batteries corresponding to a nickel metal-hydride battery, and determining whether a set timer is in operation when the rechargeable battery represents said nickel metal-hydride battery prior to determining whether the rechargeable battery is suitable for one of said first charging mode operation and said second charging mode operation, and charging the rechargeable battery when said set timer is in operation.

14. The process of claim 13, further comprised of said rechargeable battery being charged until the battery cell voltage reaches a predetermined value.

15. A process of charging a rechargeable battery comprising the steps of:

determining whether a rechargeable battery is mounted in the portable device determining whether a battery temperature is in a normal range when the rechargeable battery is mounted in the portable device;

determining the type of the rechargeable battery mounted in the portable device, when the battery temperature is in the normal range;

charging the rechargeable battery when the rechargeable battery represents a first type of rechargeable batteries;

determining whether a set timer is in operation;

determining that the rechargeable battery is defective when the set timer is not in operation;

determining whether a battery cell voltage of the rechargeable battery is above a first predetermined voltage and a battery temperature is below a first predetermined temperature, when the battery cell voltage is above said first predetermined voltage and when the set timer is in operation; and quickly charging the rechargeable battery when the battery temperature is below said first predetermined temperature until occurrence of one of when said set timer is not in operation, when the battery temperature is below a second predetermined temperature while the set timer is in operation, when battery cell voltage is not a second predetermined voltage while the battery temperature is not below said second predetermined temperature, and when a battery temperature variation is not above a third predetermined temperature per minute while the battery cell voltage is below said second predetermined voltage.

16. The process of claim 15, further comprised of said first type of rechargeable batteries corresponding to nickel metal-hydride batteries, said first predetermined voltage corresponding to 1 Volt, said first predetermined temperature corresponding to 50° C., said second predetermined voltage corresponding to 1.65 Volts, said second predetermined temperature corresponding to 55° C., and said third predetermined temperature corresponding to 1° C. per minute.

17. A process of charging a rechargeable battery representing one of a nickel metal hydride battery and a lithium-ion battery, comprising the steps of:

determining a state of a rechargeable battery connected to a battery connector and a power supply source;

determining whether the rechargeable battery represents one of a lithium-ion battery and a nickel metal-hydride battery;

starting a charging operation of the lithium-ion battery, when the rechargeable battery represents the lithium-ion battery;

changing a charging mode when a cell voltage of the lithium-ion battery reaches a first predetermined value;

completing said charging operation of the lithium-ion battery, when a charge current of the lithium-ion battery reaches a second predetermined value;

starting a charging operation of the nickel metal-hydride battery, when the rechargeable battery represents the nickel metal-hydride battery; and completing said charging operation of the nickel metal-hydride battery, when the state of the nickel metal-hydride battery satisfies a predetermined condition.

18. The process of claim 17, further comprised of said charging operation of each of the lithium-ion battery and the nickel metal-hydride battery being controlled in accordance with a timer operation.

19. A process of charging a rechargeable battery representing one of a nickel metal-hydride battery and a lithium-ion battery in a portable device, comprising the steps of:

determining whether a battery temperature is in a normal range, when the rechargeable battery is mounted on said portable device;

determining whether the rechargeable battery mounted on said portable device represents one of said nickel metal-hydride battery and said lithium-ion battery, when the battery temperature is in the normal range;

when the lithium-ion battery is mounted on said portable device, charging the lithium-ion battery in one of a first charging mode and a second charging mode when operating conditions of the lithium-ion battery are suitable for respective one of said first and said second charging mode, and completing the charging of the lithium-ion battery when a battery cell voltage and a charge current of the lithium-ion battery satisfy first predetermined conditions; and when the nickel metal-hydride battery is mounted on said portable device, charging the nickel metal-hydride battery in one of said first and said second charging mode when operating conditions of the nickel metal-hydride battery are suitable for respective one of said first and said second charging mode, and completing the charging of the nickel metal-hydride battery when a battery cell voltage, a battery temperature and a battery temperature variation of the nickel metal-hydride battery satisfy second predetermined conditions.

20. The process of claim 19, further comprised of said first charging mode corresponding to a standard charging operation and said second charging mode corresponding to a quick charging operation.

21. The process of claim 20, further comprised of said first predetermined conditions being satisfied when said battery cell voltage of the lithium-ion battery is above a predetermined voltage and said charge current of the lithium-ion battery is below a predetermined value.

22. The process of claim 19, further comprised of said second predetermined conditions being satisfied when said battery cell voltage of the nickel metal-hydride battery is below 1.65 Volt, said battery temperature of the nickel metal-hydride battery is below 55° C. and said battery temperature variation of the nickel metal-hydride battery is above 1° C. per minute.

23. A process of charging a rechargeable battery, comprising the steps of:

determining whether a battery temperature is in a normal range, when the rechargeable battery is installed in a portable device;

determining the type of the rechargeable battery installed in said portable, when the battery temperature is in the normal range;

when the rechargeable battery installed in said portable device represents a first type of rechargeable batteries, charging the rechargeable battery in one of a first charging mode and a second charging mode when operating conditions of the lithium-ion battery are suitable for respective one of said first and said second charging mode, and completing the charging of the rechargeable battery when a battery cell voltage and a charge current satisfy first predetermined conditions; and when the rechargeable battery installed in said portable device represents a second type of rechargeable batteries, charging the rechargeable battery in one of said first and said second charging mode when operating conditions of the rechargeable battery are suitable for respective one of said first and said second charging mode, and completing the charging of the rechargeable battery when a battery cell voltage, a battery temperature and a battery temperature variation satisfy second predetermined conditions.

24. The process of claim 23, further comprised of said first type of rechargeable batteries corresponding to a lithium-ion battery and said second type of rechargeable batteries corresponding to a nickel metal-hydride battery, said first charging mode corresponding to a standard charging operation and said second charging mode corresponding to a quick charging operation, said first predetermined conditions being satisfied when said battery cell voltage of the lithium-ion battery is above a predetermined voltage and said charge current of the lithium-ion battery is below a predetermined value.

25. The process of claim 24, further comprised of said second predetermined conditions being satisfied when said battery cell voltage of the nickel metal-hydride battery is below 1.65 Volt, said battery temperature of the nickel metal-hydride battery is below 55° C. and said battery temperature variation of the nickel metal-hydride battery is above 1° C. per minute.

* * * * *